BEST AVAILABLE COPY
April 6, 1937. G. HERBSTER Re. 20,324
Orig. 1,992,209
OVEN LIGHT
Original Filed Feb. 23, 1934
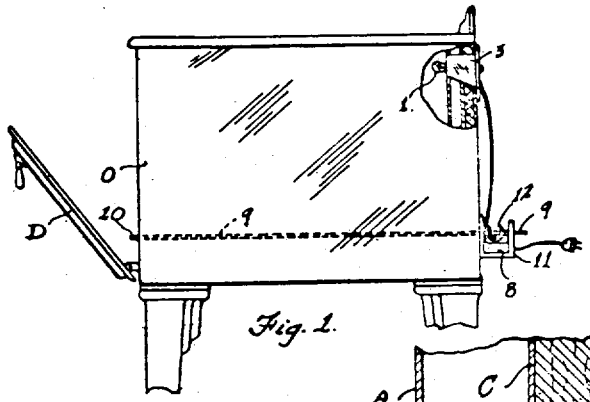
Fig. 1.
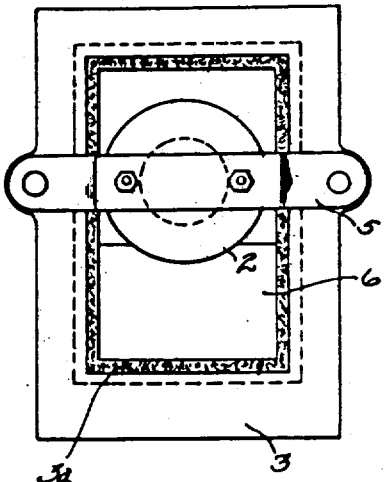
Fig. 3.
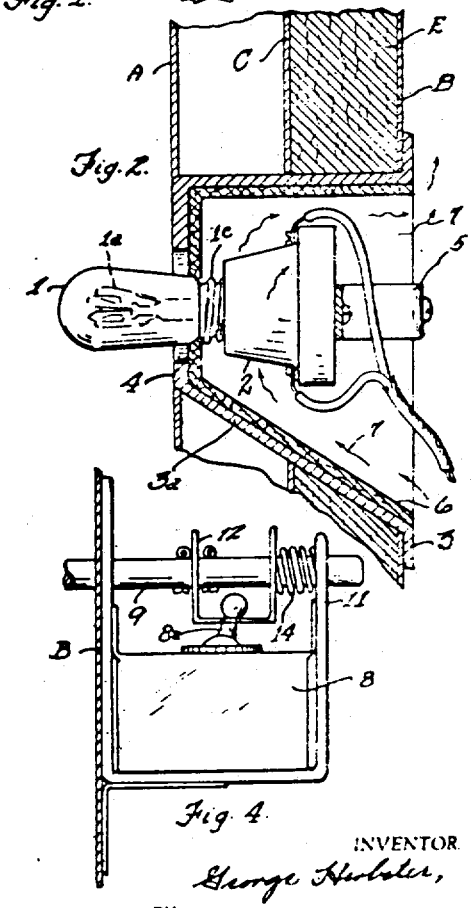
Fig. 2.
Fig. 4.
INVENTOR
George Herbster,
BY
Soule & Leonard
ATTORNEYS Reissued Apr. 6, 1937

Re. 20,324

UNITED STATES PATENT OFFICE 20,324

OVEN LIGHT

George Herbster, Cleveland, Ohio, assignor to The Cleveland Cooperative Stove Company, Cleveland, Ohio, a corporation of Ohio Original No. 1,992,209, dated February 26, 1935, Serial No. 712,602, February 23, 1934. Application for reissue May 2, 1935, Serial No. 19,480

7 Claims. (Cl. 240—5)

This invention relates to a device for illuminating the interior of ovens of commonly used types of household gas cooking ranges, the principal object being to provide a light in the oven so positioned that the contents of the oven are efficiently illuminated.

Another object is to provide an electric light for this purpose which is lighted consequent upon opening of the oven door and is extinguished consequent upon closing of the oven door whereby the life of the light bulb is increased and a saving in electric power is effected.

An equally important object of the present invention is to provide an electric light for an oven which is so arranged that the parts thereof that are apt to be damaged by heat are continuously bathed in cool outside air so as to be maintained at a safe operating temperature and not be damaged by heat from the oven.

In order that the oven may be well lighted and shadows eliminated it is desirable that the light bulb protrude into the interior of the oven and a more specific object therefore is to mount a bulb in this manner and yet at the same time maintain the bulb shank and electric power socket associated therewith at a sufficiently low degree of temperature to prevent deterioration and to effect this result by conducting the heat of the oven away from the bulb and socket through a metallic conducting medium and concurrently conveying away the heat by circulation thereabout of outside air.

Other objects and advantages will become apparent from the following specification wherein reference is made to the drawing in which Fig. 1 is a side elevation of a gas range oven showing the relative position of the elements of the present invention;

Fig. 2 is a fragmentary vertical sectional view through a wall of the oven and the device of the present invention;

Fig. 3 is a back end elevation of the device illustrated in Fig. 2; and

Fig. 4 is a fragmentary side elevation of the control switch and the operating mechanism therefor.

Referring to Figs. 1 and 2, there is illustrated a gas range having an oven O, closed at the front by the usual drop door D and at the sides and rear by the usual heat insulating walls arranged, for example, in the same manner as the rear wall shown in section in Figs. 1 and 2. This rear wall comprises an inner wall or lining A and an outer wall B, spaced apart therefrom and a partition wall C disposed therebetween and spaced from both, a core E of asbestos or other suitable heat insulating material being provided between the partition wall C and the outer wall B.

In order to illuminate the interior of the oven efficiently and without shadows it is desirable that the electric light bulb protrude beyond the inner wall A into the interior of the oven a distance sufficient to expose the filament of the bulb entirely within the limits of the oven interior. An electric light bulb 1 of the usual type is shown as so positioned in Figs. 1 and 2, the filament 1a being exposed entirely within the oven. The bulb is preferably positioned in the rear of the oven compartment and near the ceiling thereof so as to light the interior of receptacles in the oven and may be protected by an enclosing transparent shield, if desired.

The heat of the interior of ovens, however, is of such a high degree as to deleteriously affect the bulb, especially the bulb shank 1c, which is screwed into the electric socket. Not only does the heating of the shank melt the sealing wax therein and permit escape of the inert gases within the bulb but also melts the solder contacts on the shank. It is necessary, therefore, that these portions of the bulb be kept relatively cool. In order to accomplish this result an electric socket 2 is arranged on the outside of the oven compartment in a position to receive the bulb shank 1c and supply power to the bulb when the bulb is in the position described. Thus the socket is exposed to the cooler air outside of the oven, circulation of air thereabout being effected in a manner later to be described.

For mounting the light and socket and cooling the same, a housing 3 is provided, the housing preferably being in form of a cup of efficient heat conducting material, such as copper or cast iron. In the form shown, the housing is provided with an end wall 4 and is open at the opposite end to admit outside air. Aligned openings are provided in the walls A, B and C of the rear wall of the oven and arranged to snugly receive the housing endwise with the end wall 4 of the housing preferably disposed in the plane of the inner surface of the wall A so as to receive the oven heat adjacent the housing and conduct it away. An opening is also provided in the end wall 4 of the housing to permit the bulb to extend therethrough. Mounted within the housing and in spaced relation to the side and end walls thereof is an electric light socket 2 connected in the usual manner to a suitable source of power. A convenient mounting for the socket comprises a strap secured to the socket and, at its ends, secured to the housing 3 so as to support the socket out of contact with any of the walls of the housing. The socket is preferably disposed a sufficient distance back from the end wall 4 so that, when the bulb 1 is mounted therein, the shank of the bulb is entirely within the interior of the housing and does not extend into the oven.

A shield 6 of suitable heat insulating material is provided within the housing and forms a lining for the walls thereof. The shield has an opening for the passage of the bulb shank therethrough, this opening preferably being of such size that the edges of the shield defining the opening engage the bulb close to the shank and thereby prevent direct radiation of any considerable amount of heat through the opening of the wall 4 to the shank. The floor wall 3a of the housing preferably slopes downwardly away from the oven toward the outside so that the air may readily enter, as indicated by the arrows 7, and flow upwardly through the interior of the housing and out again near the top. Thus the socket and shank of the bulb are continuously bathed in fresh, relatively cool air, circulation being maintained by convection currents resulting from the heat dissipated from the shank, socket and housing. Since the walls B and C have an appreciable surface contact with the metal of the housing, a large amount of heat which enters the end wall 4 is conducted through the metal and dissipated through the walls C and E. Part of such heat is also dissipated through the portions of the housing exposed to the outside air. Thus practically no heat reaches the shank and socket except by conduction through the glass of the bulb 1. This is readily dissipated by the air bath provided about the socket and bulb shank within the housing 3.

In order to light the bulb automatically when the oven door is opened and to extinguish the bulb automatically consequent upon closing of the oven door, a suitable snap switch 8 is provided, this switch being connected in series with the socket and with a source of power in the usual manner. Mounted within the oven is an operating lever or rod 9, one end of which, indicated at 10, protrudes from the forward wall of the stove in position to be engaged and moved axially rearwardly by the oven door when the door is closed. The rod extends through the oven and out through the rear wall, on the outside of which is mounted the switch 8. A suitable bracket 11 is provided on the rear wall B to support the switch and to slidably mount the opposite end of the rod. Mounted on the rod 9, intermediate the wall B and the outermost arm of the bracket, is a yoke 12, this yoke being fixed in position axially of the rod so as to move therewith and being provided with an opening through which extends the switch operating lever 8a. A spring 14 is interposed between the yoke 12 and the outermost arm of the bracket 11, the spring being compressed when the rod is moved to the right or rearwardly consequent upon closing of the oven door and being operable when the oven door is opened to return the rod forwardly or toward the left. The switch lever is so arranged that upon movement of the rod rearwardly the switch is opened and, upon return of the rod 9 to the left, is closed. Consequently the light is turned on when the oven door is opened and is extinguished immediately upon closing of the door. The switch, being maintained on the outside of the oven, is not affected by the oven heat.

Experience has proven that a light mounted in the manner herein described will not be heated to a sufficient degree of temperature to be deleteriously affected even under continuous operation of the oven for an interval of several days, but will be heated slightly and thereafter be maintained at a constant safe temperature.

Having thus described my invention, I claim:

1. In a domestic cooking range having an oven, an electric light bulb protruding within the interior limits of the oven through a wall thereof for illuminating the interior from a point within and being directly exposed to the heat in the oven, an electric socket carried by the range for supporting said bulb and for conducting electrical power thereto, said socket while supporting the bulb in its operating position being disposed outside of the oven and directly exposed to the cooler outside atmosphere whereby the socket and parts of the bulb received thereby are undamaged by heat from the oven.

2. In a cooking range having an oven, a wall of said oven having an opening therein, a housing having a wall of heat conducting material and an opening through its said wall, said housing being mounted outside of the oven with its said wall exposed to the heat of the oven, the interior of the housing being open to the atmosphere, an electric light socket mounted in said housing in spaced relation to the side walls thereof, an electric light bulb mounted in said socket and protruding through said openings into the oven, said socket being positioned relative to said housing so that only the glass portion of the bulb protrudes into the oven, whereby the shank of the bulb and the socket are kept at a relatively low temperature, and a shield of heat insulating material disposed between the socket and walls of the housing.

3. In a cooking stove oven having spaced inner and outer rear walls, aligned openings in said walls, a housing open at one end and snugly fitting into said outer wall opening and bridging the space between the walls, said housing having an end wall disposed substantially in the plane of the inner rear wall of the oven and having an opening aligned with the opening in the inner rear wall, the open end of the housing being open to the atmosphere, an electric light socket carried by said housing in spaced relation to the walls thereof, a light bulb mounted in said socket and protruding within said end wall opening of the housing and engaging the wall edges of the housing defining the housing opening and substantially blocking the housing opening, whereby air from the outside atmosphere may pass around and into direct intimate contact with said socket and passage of heated products through said openings to the socket is prevented.

4. In a cooking range having an oven, a wall of said oven having an opening therein, housing means having a heat insulating end wall and an opening through its said wall, said housing being mounted outside of the oven compartment, with its said wall exposed to the heat of the oven, the interior of the housing being open to the atmosphere, an electric light socket mounted in said housing in spaced relation to the side walls thereof, an electric light bulb mounted in said socket and protruding through said openings into the oven, said socket being positioned relative to said housing so that only the glass portion of the bulb protrudes into the oven whereby the shank of the bulb and the socket are kept at a relatively low temperature, the opening through said heat insulating end wall of the housing being such that the edges defining the opening substantially embrace the bulb glass adjacent the shank for reducing radiation and convection of heat from the oven to the said shank.

5. In a domestic cooking range oven, one wall of the oven having a portion with an opening therethrough, an electric light bulb carried by the range and positioned to illuminate the interior of the oven, a portion of said bulb being directly exposed in said opening to the heat in the oven, means connected to the shank portion of the bulb for supplying electric current to the bulb and means for supporting the bulb in said position, said means and shank portion being disposed outside of the oven and exposed to the outside air for cooling thereby when connected and supporting the bulb in said position, whereby the parts of the bulb and means are undamaged by heat from the oven.

6. In a domestic cooking range having an oven, a wall of the oven having an opening therethrough, an electric light bulb carried by the range and positioned to illuminate the interior of the oven, said bulb engaging the wall edges defining the opening and substantially blocking the opening when the bulb is in said position for illuminating the interior of the oven, and means carried by the range exteriorly of the oven and connected to the shank portion of said bulb for supplying electric current to the bulb and for supporting the bulb in said operating position.

7. In a domestic cooking range having an oven, one wall of the oven having an opening therein, a shield carried by the range and having an opening aligned with the oven wall opening, an electric light bulb carried by the range and positioned to illuminate the interior of the oven, said bulb engaging the wall edges defining the shield opening and blocking the shield opening when the bulb is in said position for illuminating the interior of the oven, and means carried by the range externally of the oven and connected to the shank portion of the bulb for supplying electric current to the bulb and for supporting the bulb in said operating position, whereby said means and shank portion of the bulb are protected from the heat from the oven.

GEORGE HERBSTER.